G. H. CROCKER.
Seed Sower.
No. 89,739.  Patented May 4, 1869.
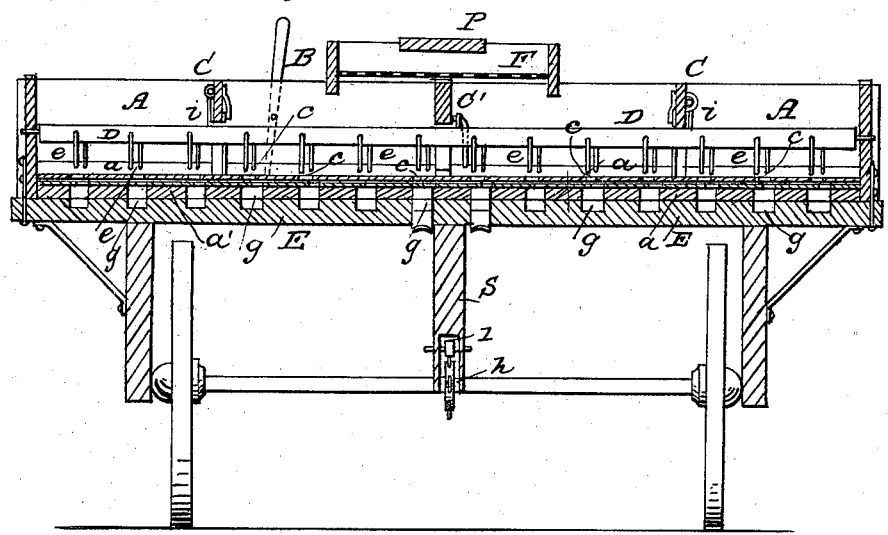
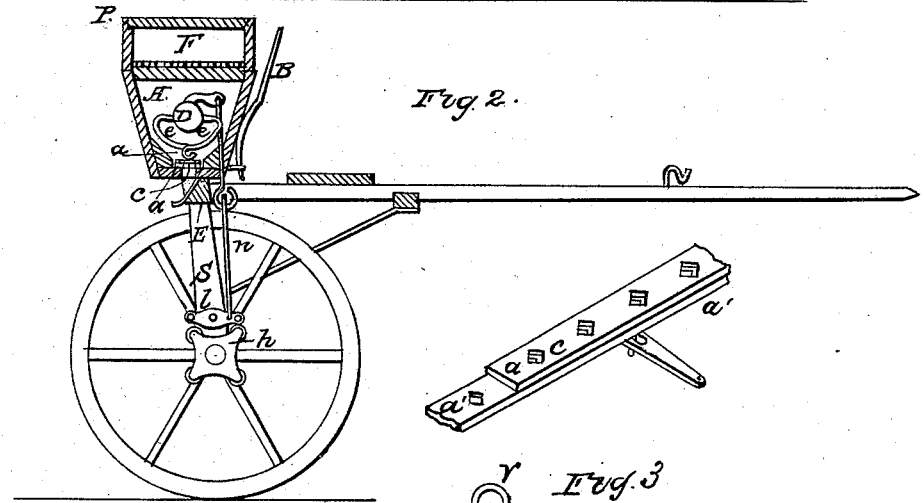
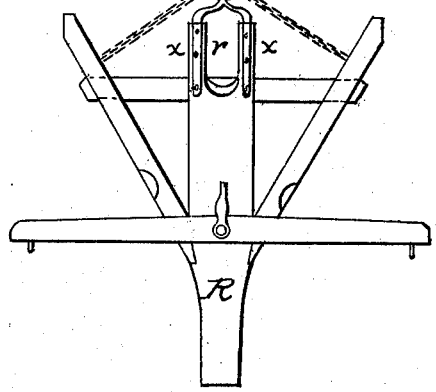

United States Patent Office.

GEORGE H. CROCKER, OF MARYSVILLE, ASSIGNOR TO HIMSELF AND DAVID L. SMITH, OF SAN FRANCISCO, CALIFORNIA.

Letters Patent No. 89,739, dated May 4, 1869.

IMPROVEMENT IN SEED-SOWER.

The Schedule referred to in these Letters Patent and making part of the same.

*To all whom it may concern:*

Be it known that I, GEORGE H. CROCKER, of Marysville, county of Yuba, State of California, have invented an Improved Seed-Sower; and I do hereby declare the following description and accompanying drawings are sufficient to enable any person skilled in the art or science to which it most nearly appertains, to make and use my said invention or improvement, without further invention or experiment.

My invention relates to a new and improved seed-sower, and more particularly to be used for sowing grain which requires to be thrown broadcast upon the field; and the advantages which I claim over other seed-sowers are—

First, the grain can be dropped more evenly than with any other sower, on account of the peculiar arrangement for feeding the grain regularly, and preventing the openings through which it passes from becoming clogged by any means; and Secondly, the cost of construction, which is reduced to a mere fraction of what is usually charged for seed-sowers, as my device can be attached to the Randall rake, when convenient, without requiring any change in the construction of either, thus rendering the rake of double utility to farmers, and recommending the sower on account of its cheapness and ease of attachment.

To more fully illustrate and describe my invention, reference is had to the accompanying drawings, forming a part of this specification, of which—

Figure 1 is a back view with a section of the trough.
Figure 2 is an end sectional view.
Figure 3 is a view of the pole.

Similar letters of reference in each of the figures indicate like parts.

In the accompanying drawings, the sower is represented as mounted on the frame or carriage of the Randall rake, the rakes being removed, this being the most convenient carriage for supporting it, but it can be mounted upon any style of carriage, which can readily be adapted for that purpose by the addition of two or three pieces of timber, arranged so as to give the proper support for the sower.

The object of using it with the rake-carriage is to reduce the cost of the sower, as nearly every farmer has a rake, and all that will be necessary is to place the sowing-device upon it.

The sower consists of a trough or box, A, of the desired length. The sides of this box diverge from the bottom upward, making it widest at the top, so that the grain will always settle to the proper place to be dropped.

In the bottom of the box is a narrow metal plate or bottom, $a$, running longitudinally through the box, which is provided with numerous holes, $c\ c\ c$, through which the grain passes from the box. The shape of these holes is not material; yet I prefer a square or diamond, for reasons hereinafter to be explained.

Directly beneath the plate $a$ is a sliding plate, $a'$, which is provided with holes corresponding to the holes in the plate $a$.

The plate $a'$ is moved along from side to side by a lever, B, extending upward on the outside of the box, within easy grasp of the driver. By moving this plate the holes $c\ c\ c$ may be made larger or smaller, as desired, their arrangement being such that the square or diamond-shaped holes are formed at any size of opening, thus allowing the grain to more easily free itself.

Inside, the box is divided into compartments by partitions C C' C, so that the width of ground it is desired to sow can be regulated.

The partitions C C may be removed, when necessary, by withdrawing the pins $i\ i$, which pass diagonally into the sides of the box, each way.

Running longitudinally through the box, near the bottom, and having its bearings in each end of the box, is an oscillating shaft D, which is provided with curved fingers $e\ e\ e$. These fingers are attached to the shaft on opposite sides, and are curved downward, and their ends hooked directly over the openings $c\ c\ c$, in the bottom of the box.

This box is placed upon the timber E of a carriage, so that the holes $c\ c$ shall be over the timber, and inclined slots $g\ g$ are cut from the timber under each hole, so that the grain, after passing through the holes, shall strike the inclined slots, and thus be scattered before reaching the ground.

The oscillating shaft D is operated by means of a two, three, or four-point cam, $h$, attached to and operated by the axle of the carriage.

These cams, as they revolve, operate upon a cam-lever, $l$, to which a rod, $n$, is attached, the opposite end being connected with the shaft D.

This operating-device may be either attached to the axle in the centre or at the ends, as most convenient, to suit the form of carriage employed.

The cams may be provided with small friction-rollers in their ends, when desired, to reduce the friction consequent on its coming in contact with the cam-lever $l$.

A small box, F, is arranged so as to fit over the trough or box A, and is placed in the centre of the trough, over the partition C'.

The bottom of the box is formed of coarse wire gauze, so as to form a screen, and a suitable seat, $p$, may be arranged on its top. The grain is placed in this box, and run through into the trough A, before it is sowed, in order to clear it of any straw or heads which might otherwise tend to clog or choke up the opening in the bottom of the trough.

The arrangement of this sower is such that it is impossible to clog, as all refuse matter which may be in the wheat, and which would be too large to pass through the holes, is taken out by running it through the screen.

The holes are always kept clear, for the free passage of the grain, by the hooked fingers, operated by the oscillating shaft, which are so arranged that one of the fingers operates over each end of the opening, and near enough to pick out any grains that may find a lodgment.

The seed is thoroughly scattered before it reaches the ground; but should it be found desirable to cause it to scatter more widely, small crops may be secured in the inclined slots in the timbers, and so graduated as to drop the grain in any manner desired.

Should it be desired to attach a harrow, the shafts or thills can be removed, and a pole, R, attached to the axle.

The rear end of this pole is provided with an opening or collar, r, through which the middle standard S passes, and inside of which the cam h revolves.

A metal band, X, is secured to the arms on each side of the collar, and passes around the standard, and a ring, v, is secured to it, to which the harrow may be attached.

With this device for sowing grain, a lad of ten or twelve years can, by first having the sower arranged, do all the work that is necessary for sowing and harrowing a field.

The work can be done more satisfactorily, and at a much less expense, than can be accomplished by any other means.

Having thus described my invention,

What I claim, and desire to secure by Letters Patent, is—

1. The rock-shaft D and fingers e e, in combination with the peculiarly-constructed cam h and lever l, and the connecting-rod n, substantially as set forth.

2. The detachable pole R, provided with the opening r, band X, and ring v, substantially as and for the purposes set forth.

In witness whereof, I have hereunto set my hand and seal.

GEORGE H. CROCKER. [L. S.]

Witnesses:
A. W. CUTTS,
MARTIN C. BLANCK.